United States Patent
Sakurai

(10) Patent No.: US 9,542,273 B2
(45) Date of Patent: Jan. 10, 2017

(54) STORAGE CONTROL APPARATUS, STORAGE CONTROL SYSTEM, AND STORAGE CONTROL METHOD FOR FAILURE DETECTION AND CONFIGURATION OF CASCADED STORAGE CABINETS

(71) Applicant: FUJITSU LIMITED, Kawasaki-shi, Kanagawa (JP)

(72) Inventor: Kazuko Sakurai, Koganei (JP)

(73) Assignee: FUJITSU LIMITED, Kawasaki (JP)

(*) Notice: Subject to any disclaimer, the term of this patent is extended or adjusted under 35 U.S.C. 154(b) by 139 days.

(21) Appl. No.: 14/458,558

(22) Filed: Aug. 13, 2014

(65) Prior Publication Data
US 2015/0100821 A1  Apr. 9, 2015

(30) Foreign Application Priority Data
Oct. 9, 2013  (JP) .................................. 2013-212336

(51) Int. Cl.
| | | |
|---|---|---|
| G06F 11/10 | (2006.01) | |
| G06F 11/30 | (2006.01) | |
| G06F 11/14 | (2006.01) | |
| G06F 11/07 | (2006.01) | |
| G06F 11/20 | (2006.01) | |

(52) U.S. Cl.
CPC ....... G06F 11/1092 (2013.01); G06F 11/0727 (2013.01); G06F 11/1423 (2013.01); G06F 11/1458 (2013.01); G06F 11/1469 (2013.01); G06F 11/2082 (2013.01); G06F 11/3034 (2013.01)

(58) Field of Classification Search
CPC .............. G06F 11/0727; G06F 11/1423; G06F 11/1458; G06F 11/1469; G06F 11/2082; G06F 11/3034; G06F 11/1092
See application file for complete search history.

(56) References Cited

U.S. PATENT DOCUMENTS 4,754,397 A * 6/1988 Varaiya .................. G06F 1/183
                                                  360/133
5,608,865 A * 3/1997 Midgely ............. G06F 11/2028
                                                  707/999.2

(Continued)

FOREIGN PATENT DOCUMENTS

| JP | 7-325674 | 12/1995 |
|---|---|---|
| JP | 11-184643 | 7/1999 |
| JP | 2007-87039 | 4/2007 |

Primary Examiner — Albert Decady
Assistant Examiner — Paul Contino
(74) Attorney, Agent, or Firm — Staas & Halsey LLP

(57) ABSTRACT

A storage control apparatus includes: a detector configured to detect a failure in one of a plurality of storages, each of a plurality of cabinets coupled in a cascade and having the plurality of storage units; a mover configured to move data in one or a plurality of first storages accommodated in a first cabinet including a failed storage having the failure detected by detector to one or a plurality of second storages accommodated in a second cabinet included in the plurality of cabinets; and a connection controller configured to control a first connection between the first cabinet and the plurality of cabinets other than the first cabinet and a second connection between the plurality of first storages in the first cabinet and the plurality of cabinets other than the first cabinet.

13 Claims, 11 Drawing Sheets

(56) References Cited

U.S. PATENT DOCUMENTS

| | | | | |
|---|---|---|---|---|
| 5,768,551 A * | 6/1998 | Bleiweiss | | G06F 11/2094 710/316 |
| 6,154,853 A * | 11/2000 | Kedem | | G06F 11/1084 711/114 |
| 6,182,198 B1 * | 1/2001 | Hubis | | G06F 11/1466 707/999.202 |
| 6,223,252 B1 * | 4/2001 | Bandera | | G06F 11/2069 711/112 |
| 6,915,448 B2 * | 7/2005 | Murphy | | G06F 11/2094 714/41 |
| 7,039,828 B1 * | 5/2006 | Scott | | G06F 11/1443 709/227 |
| 7,103,798 B2 * | 9/2006 | Morita | | G06F 11/0727 714/6.32 |
| 7,222,259 B2 * | 5/2007 | Tanaka | | G06F 11/1092 714/6.2 |
| 7,249,277 B2 * | 7/2007 | Arai | | G06F 11/1092 711/114 |
| 7,254,741 B1 * | 8/2007 | Sardella | | G06F 11/2015 714/14 |
| 7,315,958 B1 * | 1/2008 | Bridge, Jr. | | G06F 11/1076 714/3 |
| 7,320,083 B2 * | 1/2008 | Davies | | G06F 11/1456 714/3 |
| 7,418,623 B2 * | 8/2008 | Elliott | | G06F 3/0605 714/6.32 |
| 7,430,568 B1 * | 9/2008 | DeKoning | | G06F 11/0727 |
| 7,496,785 B2 * | 2/2009 | Elliot | | G06F 11/1076 711/114 |
| 7,502,955 B2 | 3/2009 | Ishikawa et al. | | |
| 7,516,352 B2 * | 4/2009 | Elliott | | G06F 11/2221 714/3 |
| 7,941,628 B2 * | 5/2011 | Kalos | | G06F 3/0607 711/112 |
| 8,135,906 B2 * | 3/2012 | Wright | | G06F 11/2069 711/112 |
| 8,381,027 B1 * | 2/2013 | Liu | | G06F 11/201 714/13 |
| 8,719,619 B2 * | 5/2014 | Li | | G06F 11/1092 714/6.22 |
| 8,935,498 B1 * | 1/2015 | Natanzon | | G06F 11/1662 707/655 |
| 9,189,311 B2 * | 11/2015 | Li | | G06F 11/1088 |
| 2003/0018927 A1 * | 1/2003 | Gadir | | G06F 11/2005 714/4.11 |
| 2003/0041201 A1 * | 2/2003 | Rauscher | | G06F 11/2089 710/300 |
| 2003/0041211 A1 * | 2/2003 | Merkey | | G06F 11/1076 711/114 |
| 2003/0115412 A1 * | 6/2003 | Franklin | | G06F 3/0601 711/114 |
| 2003/0237019 A1 * | 12/2003 | Kleiman | | G06F 11/1092 714/6.32 |
| 2004/0172489 A1 * | 9/2004 | Shikada | | G06F 11/2094 710/15 |
| 2004/0230742 A1 * | 11/2004 | Ikeuchi | | G06F 3/061 711/112 |
| 2005/0114728 A1 * | 5/2005 | Aizawa | | G06F 11/1092 714/6.32 |
| 2005/0210322 A1 * | 9/2005 | Corrado | | G06F 3/0619 714/13 |
| 2005/0228943 A1 * | 10/2005 | DeCenzo | | G06F 11/1076 711/114 |
| 2005/0243610 A1 * | 11/2005 | Guha | | G06F 1/3203 365/189.05 |
| 2005/0268119 A9 * | 12/2005 | Guha | | G06F 1/3203 713/300 |
| 2005/0283655 A1 * | 12/2005 | Ashmore | | G06F 11/004 714/6.32 |
| 2006/0015771 A1 * | 1/2006 | Van Gundy | | G06F 11/2094 714/6.32 |
| 2006/0077724 A1 * | 4/2006 | Chikusa | | G06F 11/1076 365/189.05 |
| 2006/0212747 A1 * | 9/2006 | Okamoto | | G06F 11/1092 714/6.12 |
| 2007/0101187 A1 * | 5/2007 | Daikokuya | | G06F 11/1076 714/6.22 |
| 2007/0101188 A1 * | 5/2007 | Lin | | G06F 11/1092 714/6.12 |
| 2008/0010507 A1 * | 1/2008 | Vingralek | | G06F 11/1092 714/6.32 |
| 2008/0275975 A1 * | 11/2008 | Pandey | | H04L 49/70 709/223 |
| 2010/0077252 A1 * | 3/2010 | Siewert | | G06F 11/2094 714/6.12 |
| 2012/0096309 A1 * | 4/2012 | Kumar | | G06F 11/00 714/6.22 |
| 2013/0073900 A1 * | 3/2013 | Li | | G06F 11/1092 714/6.22 |
| 2013/0262921 A1 * | 10/2013 | Gao | | G06F 11/1092 714/6.24 |
| 2013/0262924 A1 * | 10/2013 | Ogihara | | G06F 11/1412 714/15 |
| 2014/0019579 A1 * | 1/2014 | Motwani | | H04L 29/08549 709/216 |
| 2014/0173332 A1 * | 6/2014 | Bennah | | G06F 11/2028 714/4.11 |
| 2014/0281690 A1 * | 9/2014 | Hsu-Hung | | G06F 11/2082 714/6.23 |
| 2014/0351636 A1 * | 11/2014 | Yin | | G06F 11/1662 714/15 |
| 2015/0012775 A1 * | 1/2015 | Cudak | | G06F 3/0619 714/6.22 |
| 2015/0081993 A1 * | 3/2015 | Christopher | | G06F 11/1451 711/162 |
| 2015/0088821 A1 * | 3/2015 | Blea | | G06F 3/06 707/624 |

* cited by examiner

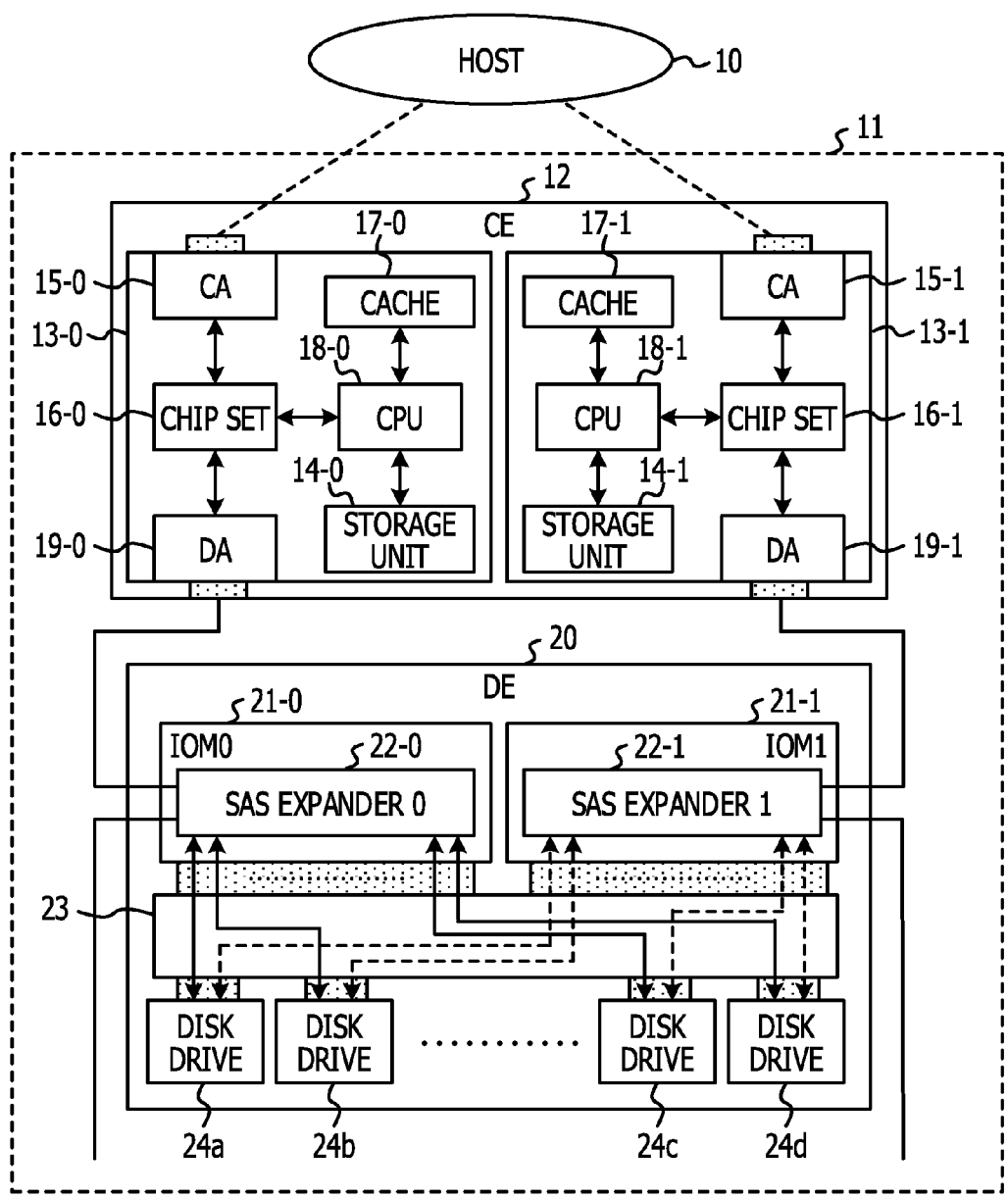

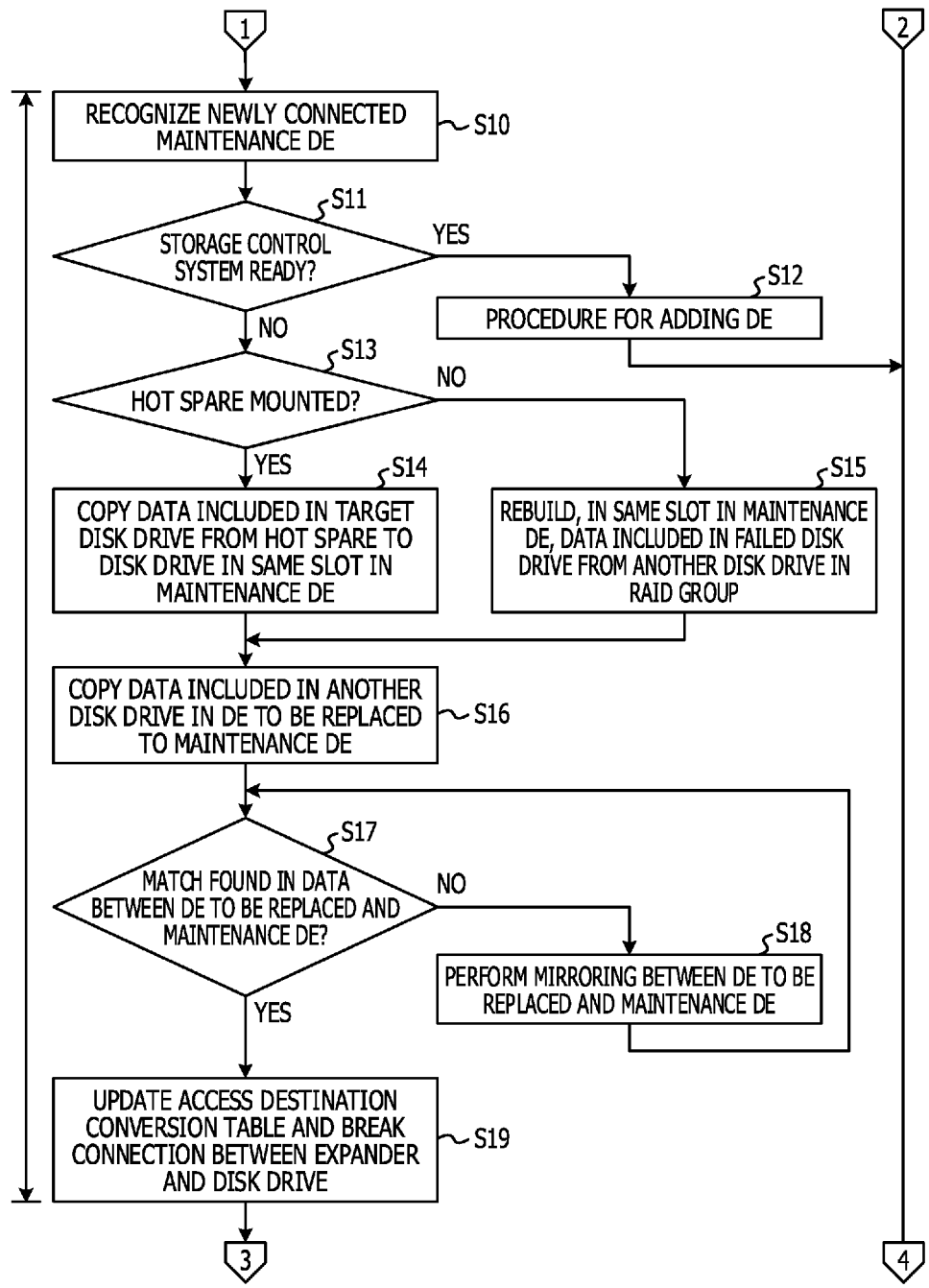

FIG. 7

| | DISK DRIVE REPLACEMENT | DE REPLACEMENT | CABLE RECONNECTION | REBUILDING | TOTAL |
|---|---|---|---|---|---|
| DE REPLACEMENT IS APPLIED | 20 MINUTES | 10 MINUTES | 20 MINUTES | 100 MINUTES | 150 MINUTES |
| DE REPLACEMENT IS NOT APPLIED | 0 MINUTE | 10 MINUTES | 20 MINUTES | 0 MINUTE | 30 MINUTES |

STORAGE CONTROL APPARATUS, STORAGE CONTROL SYSTEM, AND STORAGE CONTROL METHOD FOR FAILURE DETECTION AND CONFIGURATION OF CASCADED STORAGE CABINETS

CROSS-REFERENCE TO RELATED APPLICATION

This application is based upon and claims the benefit of priority of the prior Japanese Patent Application No. 2013-212336, filed on Oct. 9, 2013, the entire contents of which are incorporated herein by reference.

FIELD

The embodiments discussed herein are related to control of a storage system.

BACKGROUND

Components constituting a storage control system include drive enclosures (DEs) that stores a plurality of disk drives in which information is stored. The plurality of disk drives forms a redundant array of inexpensive disks (RAID) group.

Related technologies are disclosed in Japanese Laid-open Patent Publication Nos. 7-325674, 2007-87039, and 11-184643.

SUMMARY

According to an aspect of the embodiments, a storage control apparatus includes: a detector configured to detect a failure in one of a plurality of storages, each of a plurality of cabinets coupled in a cascade and having the plurality of storage units; a mover configured to move data in one or a plurality of first storages accommodated in a first cabinet including a failed storage having the failure detected by detector to one or a plurality of second storages accommodated in a second cabinet included in the plurality of cabinets; and a connection controller configured to control a first connection between the first cabinet and the plurality of cabinets other than the first cabinet and a second connection between the plurality of first storages in the first cabinet and the plurality of cabinets other than the first cabinet.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 illustrates an example of a storage control system;
FIGS. 6A, 6B, and 6C illustrate an example of a flow of DE replacement;
FIG. 7 illustrates examples of times during which a storage control system was stopping.

DESCRIPTION OF EMBODIMENTS

Figure 1:
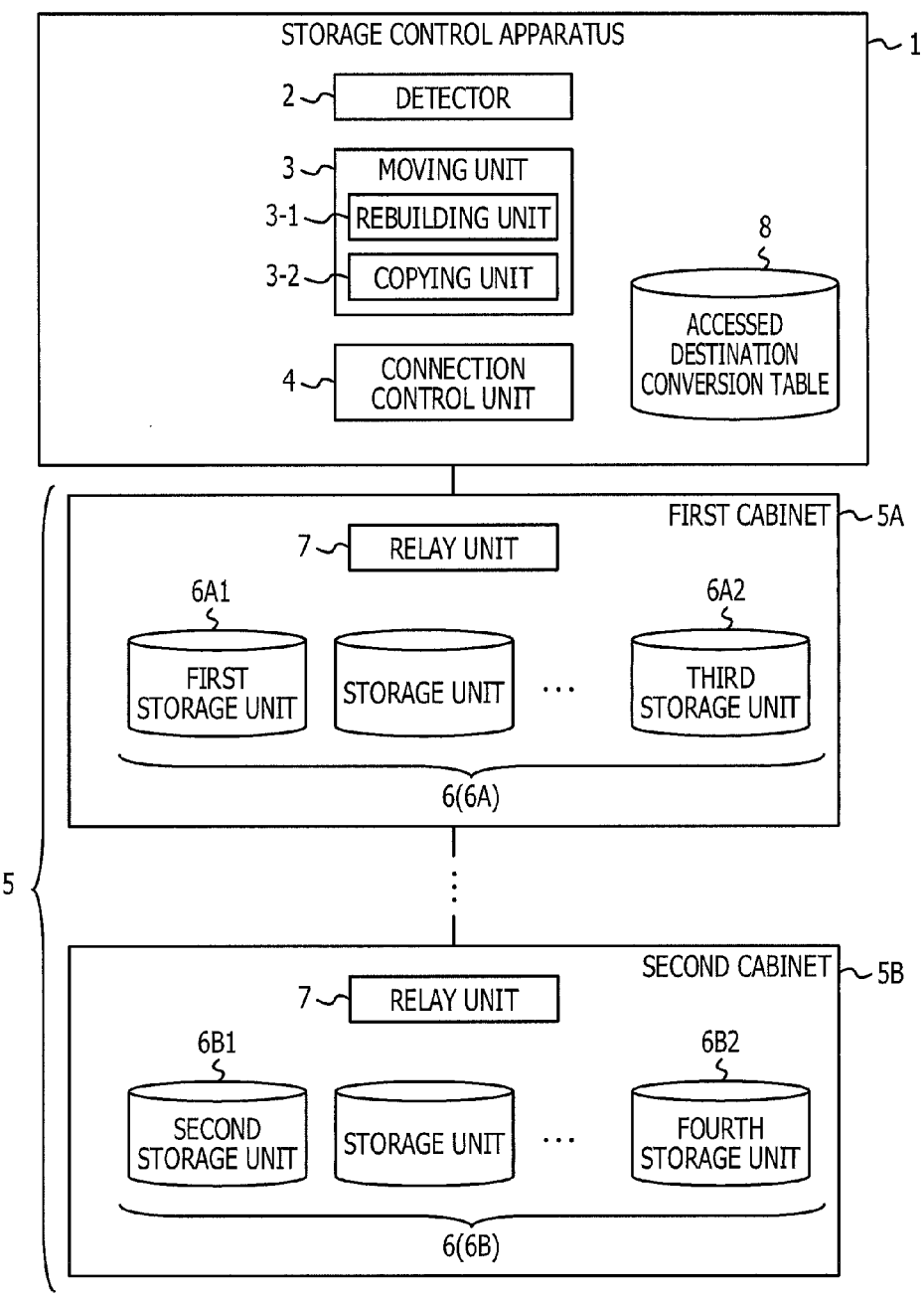
FIG. 1 illustrates an example of a storage control system.

If a failure occurs in a DE, a maintenance part is substituted for a disk drive, an input-output module (IOM), a power supply unit (PSU), or another unit, in the DE, for which active replacement is possible. In active replacement, an internal part is removed and replaced while the storage control system is operating. If the failure occurs in the DE continuously even after a disk drive, an IOM, a PSU, or another unit has been replaced, a disk accepting connector (disk slot) in the DE may be faulty. In this case, the IOM, PSU, or other unit is decided not to be faulty and the DE is replaced. The operation of the storage control system is stopped before the DE is replaced, in which case a time to stop the storage control system may be awaited. When the storage control system becomes ready to be stopped, the power of the storage control system is turned off, stopping the system operation. Disk drives are moved from the DE to be replaced to a new DE (maintenance DE) with their sequence unchanged, and the DE to be replaced is removed and the maintenance DE is mounted. The cables in the maintenance DE are coupled as before, completing the replacement of the DE. To rebuild an RAID, data is written back to new disk drives and other processing is performed.

In another maintenance technology for information processing systems, active maintenance is performed for a desired semiconductor memory unit including a semiconductor memory, for example, without a semiconductor memory being duplicated.

A disk array system, for example, detects that a failure has occurred in one of a plurality of data disks that provide at least one RAID group. Another data disk in the RAID group to which the failed data disk belongs is used, and a collection copy to a spare disk is performed. After the failed data disk has been replaced with a new data disk used for replacement, the disk array system manages the spare disk as the data disk and also manages the new data disk as the spare disk. Accordingly, a time to restore data is shortened.

If, for example, a disk drive including a disk array fails, a restoring unit uses a hot swapping function to move data included in the failed disk drive to a spare disk drive and changes the disk array configuration so that the spare disk drive is used instead of the failed disk drive. The restoring unit moves the data in the spare disk drive to a replacement disk drive without stopping operation while the redundant state of the disk array is kept unchanged. The restoring unit then changes the disk array configuration again so that the replacement disk drive is used instead of the spare disk drive. In a disk array device that has a hot swap function, therefore, the physical placement of the disk array of the disk drive is kept unchanged without reliability being lowered.

A plurality of DEs are coupled in a cascade. If any one of the plurality of DEs is replaced, therefore, communication is ceased and the operation of the system is stopped. If the system operation stops, the business of the customer may be affected. During a period until a time at which the system can be stopped is reached, an operation is continued by using the DE to be replaced, so the redundancy of the RAID system is lost during the operation. If another disk slot in the DE becomes unavailable in this state, data may be lost.

Even if, for example, a failed disk slot is unavailable while a time at which a storage control system can be stopped is awaited, if a hot spare disk drive is available, data in the hot spare disk drive may be used for redundant operation. Even in a non-redundant state that is entered when, for example, another disk fails and becomes unavailable and thereby no more hot spare is available, the system operation may be continued.

During DE replacement, it is desirable to mount new disks at correct positions in a limited time. This may imposes a large burden on a maintenance person.

When a DE is replaced together with its cabinet due to a failure in the DE, data is saved in a maintenance DE while the storage control system is operating, so the DE can be replaced without stopping the customer's system. If it is determined that IOMs, the PSU, and other units in the DE for which active replacement is possible are not problematic but a part of the DE (for example, a backplane or the cabinet) is problematic, the DE may be replaced. In an example in which a DE is replaced, a problem may occur in that, for example, a particular disk is unavailable due to a disk slot failure in the DE or another failure. For example, an inter-cabinet interface in an IOM is not problematic.

FIG. 1 illustrates an example of a storage control system. The storage control system includes a storage control apparatus 1 and a plurality of cabinets 5. The storage control apparatus 1 controls access to the plurality of cabinets 5. The storage control apparatus 1 may include, for example, a control module (CM) 13. Each of the plurality of cabinets 5 accommodates a plurality of storage units 6. The plurality of cabinets 5 are coupled in a cascade. Each of the plurality of cabinets 5 may include, for example, drive enclosures DEs 20. Each of the plurality of storage units 6 may correspond to a disk drive 24.

The storage control apparatus 1 includes a detector 2, a moving unit 3, a connection control unit 4, and an accessed destination conversion table 8. The detector 2 detects a failure in a storage unit 6 included in any one of the plurality of cabinets 5. The detector 2 may include, for example, a central processing unit (CPU) 18.

The moving unit 3 moves data in all storage units 6 accommodated in a first cabinet 5A that includes a first storage unit 6A1 in which a failure has been detected to one or a plurality of storage units 6B accommodated in a second cabinet 5B that is coupled in a cascade directly or indirectly to the first cabinet 5A. Movement of data may include rebuilding, copying, or a combination of rebuilding and copying. The moving unit 3 may include, for example, a CPU 18.

The connection control unit 4 continues the connection of a relay unit 7, in the first cabinet 5A, which is used for a cascade connection, and breaks the connection of a storage unit 6A in the first cabinet 5A. The connection control unit 4 may break the connections of all storage units 6A in the first cabinet 5A. The relay unit 7 may include, for example, a serial attached small computer system interface (SAS) expander 22. The connection control unit 4 may include, for example, a CPU 18.

Due to this structure, a network is not suspended between DEs 20 coupled in a cascade. Therefore, without stopping the storage control system, a stable system operation may be continued with redundancy maintained until a prescribed time such as periodic inspection.

After, for example, the connections of all storage units 6A in the first cabinet 5A have been broken, the connection control unit 4 changes access to all storage units 6A in the first cabinet 5A to access to storage units 6B in the second cabinet 5B. When a connection is broken, the connection control unit 4 changes the access destination of a cabinet or storage units in the cabinet, the access destination being indicated in the accessed destination conversion table 8, from the first cabinet 5A or each storage unit 6A in the first cabinet 5A to the second cabinet 5B or each storage unit 6B in the second cabinet 5B.

Due to this structure, a cabinet at a new access destination or a storage unit in the cabinet at the new access destination may be accessed.

When the second cabinet 5B that is coupled in a cascade directly or indirectly to the first cabinet 5A, the moving unit 3 moves data in all storage units 6A in the first cabinet 5A to one or a plurality of storage units 6B in the second cabinet 5B.

Due to this structure, when the second cabinet 5B is coupled in a cascade, the moving unit 3 may automatically move data in all storage units 6A in the first cabinet 5A to one or a plurality of storage units 6B in the second cabinet 5B. Three movement patterns described below may be involved in the movement of data.

In a first movement pattern, the moving unit 3 includes a rebuilding unit 3-1 and a copying unit 3-2. The rebuilding unit 3-1 performs rebuilding as described below, according to the parity data of storage units 6A, in the first cabinet 5A, that are included in an RAID group, the storage units 6A being other than the first storage unit 6A1. For example, the rebuilding unit 3-1 rebuilds data included in the first storage unit 6A1 in a second storage unit 6B1 corresponding to the first storage unit 6A1, the second storage unit 6B1 being included in the second cabinet 5B. In this case, the copying unit 3-2 copies data included in each storage unit 6A in the first cabinet 5A other than the first storage unit 6A1 to the corresponding storage units 6B included in the second cabinet 5B.

In a second movement pattern, a third storage unit 6A2 is provided in the first cabinet 5A as a standby storage unit. The rebuilding unit 3-1 rebuilds, in the third storage unit 6A2, data included in the first storage unit 6A1 according to the parity data of storage units 6A that are included in an RAID group and are other than first the storage unit 6A1 in the first cabinet 5A. The copying unit 3-2 copies data in the first storage unit 6A1 from the third storage unit 6A2 to a fourth storage unit 6B2 corresponding to the third storage unit 6A2, the fourth storage unit 6B2 being included in the second cabinet 5B.

In a third movement pattern, the copying unit 3-2 copies data in all storage units 6A accommodated in the first cabinet 5A in one or a plurality of storage units 6B accommodated in the second cabinet 5B. Upon completion of copying, the rebuilding unit 3-1 rebuilds the data included in the first storage unit 6A1 in a storage unit 6B, in the second cabinet 5B, that correspond to the first storage unit 6A1 in the first cabinet 5A, according to the parity data of storage units 6A that are other than the first storage units 6A1 in the first cabinet 5A.

Due to this structure, disk data in the corresponding slot in a newly mounted maintenance drive enclosure can be copied from another disk drive mounted in the drive enclosure in which the failed disk drive has been mounted.

FIG. 2 illustrates an example of a storage control system. The storage control system 11 is coupled to a host 10 such as a server. The storage control system 11 includes a control apparatus enclosure (CE) 12 having an RAID controller and drive enclosures (DEs) 20 in which a plurality of disk drives 24 are mounted. The DEs 20 may have substantially the same structure; they may have the same number of slots.

The CE 12 includes controller modules (CMs) 13 (13-0 and 13-1). The CMs 13 (13-0 and 13-1) control the disk drives 24. Each of the CMs 13 (13-0 and 13-1) may be a controller module that writes data transmitted from the host 10 to a disk drive 24 and reads out data from a disk drive 24 in response to a request from the host 10. One of these CMs 13 is referred to as a 0-system CM and is denoted CM 0 (13-0), and the other CM 13 is referred to as a 1-system CM and is denoted CM 1 (13-1).

Each CM 13 includes a storage unit 14, a channel adapter (CA) 15, a chip set 16, a cache 17, a CPU 18, and a device adapter (DA) 19. The storage unit 14, the CA 15, chip set 16, cache 17, CPU 18, and DA 19 are coupled through an internal bus.

The storage units 14 (14-0 and 14-1) are each, for example, a solid state drive (SSD), a hard disk drive, or a semiconductor memory device, and may store an access conversion table, a program that executes processing, or the like. The CAs 15 (15-0 and 15-1) may be each an interface control unit for the host 10 coupled to the storage control system 11. The chip sets 16 (16-0 and 16-1) may be each a switch unit used to couple the relevant CA 15, CPU 18 and DA 19. The caches 17 (17-0 and 17-1) may be each a storage unit that temporarily store data. The CPUs 18 (18-0 and 18-1) may be each a computing device that controls the whole of the relevant CM 13. When the CPUs 18 (18-0 and 18-1) read a program from the relevant storage unit 14, they function as the detector 2, moving unit 3, or connection control unit 4. The CPU 18-0 and CPU 18-1 mutually communicate through a communication line. If a unit in one CM 13 fails, access from the host 10 is changed to the other CM 13. The DAs 19 (19-0 and 19-1) may be each an interface control unit for the DE 20.

The reference numerals of the components constituting the CM 0 are suffixed with "-0". The reference numerals of the components constituting the CM 1 are suffixed with "-1". The reference numerals of components common to the CM 0 and CM 1 are not suffixed with "-0" or "-1".

The DE 20 includes input-output modules (IOMs) 21 (21-0 and 21-1), a midplane 23, and disk drives 24 (24a, 24b, . . . , 24c, and 24d).

The IOMs 21 (21-0 and 21-1) may be each a switch unit that comprehensively controls the DE 20 and relays data between the CM 0 and disk drives 24 or between the CM 1 and disk drives 24. For example, the switch unit may include a serial attached SCSI (SAS) expander (SCSI: small computer system interface).

The SAS expander 22-0 is coupled to the DA 19-0 of the CM 0 (13-0), and the SAS expander 22-1 is coupled to the DA 19-1 of the CM 1 (13-1). The IOM 21-0 or 21-1 may be coupled to the IOM 21 in another DE 20.

The midplane 23 may be a board that relays between the IOM 0 and a disk drive 24 or between the IOM 1 and a disk drive 24.

The disk drives 24 (24a, 24b, . . . , 24c, and 24d) may be a plurality of large-capacity storage units that store data. For example, each disk drive 24 may be a solid state drive (SSD), a hard disk drive, or a semiconductor memory device. If one of a plurality of disk drives 24 is used as a hot spare, a plurality of disk drives 24 excluding the hot spare may form an RAID group. If there is no hot spare, all disk drives 24 may form an RAID group.

Figure 3A:
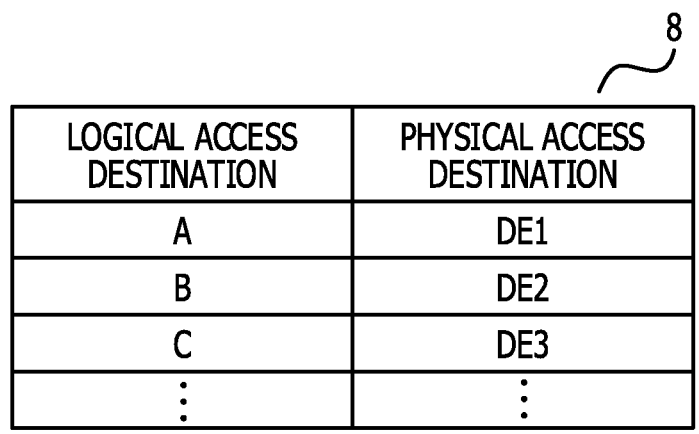
FIGS. 3A and 3B each illustrate an example of an access destination conversion table.
Figure 3B:
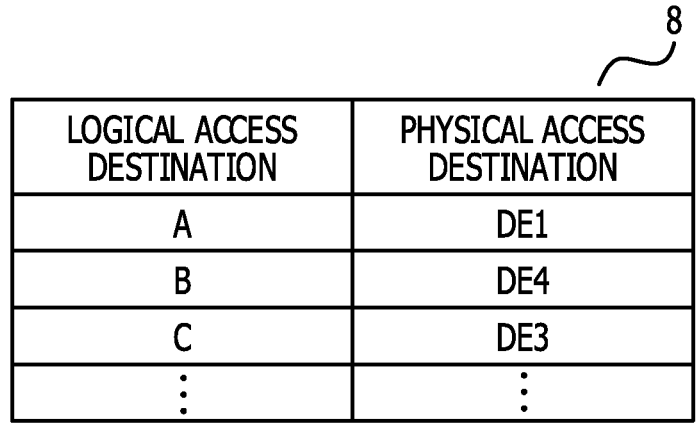

FIGS. 3A and 3B each illustrate an example of an access destination conversion table. The access destination conversion table 8 may be stored in the storage unit 14 in the CM 13. The access destination conversion table 8 is used to covert a logical access destination to a physical access destination. The access destination conversion table 8 may include a data field called "logical access destination" and a data field called "physical access destination". The logical access destination data field stores the logical names of DEs 20, and the physical access destination data field stores the physical names of the DEs 20. If an accessed DE 20 (or a disk drive 24 in the DE 20) is changed, a new disk name is set in the physical access destination data field, but the name in the logical access destination data field may not be changed. In view of this, the CM 13 manages accesses to the DE 20 by using logical access destinations. Accordingly, even if a DE 20 to be accessed is physically changed, the operation of the CM 13 may not be changed.

For example, upon completion of detection of a failure in a disk drive 24 in the DE 20, the CE 12 may enter a maintenance mode. If the CM 13 detects in the maintenance mode that a new DE 20 has been mounted, a method of rebuilding data in the failed disk drive (target disk drive) may be determined according to whether there is a disk drive 24 usable as a hot spare.

Case 1: If a hot spare (disk drive) is mounted in the midplane 23, the CM 13 rebuilds data of the target disk drive that has been rebuilt in a hot spare in a disk drive 24 which is mounted at a position corresponding to the target disk drive in the newly mounted maintenance DE.

Case 2: If there is no hot spare, the CM 13 rebuilds data included in the target disk drive in a disk drive 24 at the position corresponding to the target disk drive in the maintenance DE, by using parity data in disk drives 24 which is included in the RAID group and is other than the target disk drive. The CM 13 then copies data from disk drives 24 (excluding the target disk drive) mounted in the DE 20 to be replaced to disk drives 24 which are mounted at the positions corresponding to the disk drives 24 (excluding the target disk drive) in the DE 20 to be replaced in the maintenance DE.

Case 3: For example, the CM 13 may copy data from all disk drives 24 (excluding the target disk drive) mounted in the DE to be replaced to the corresponding disk drives 24 in the maintenance DE. The CM 13 may then rebuild data included in the target disk drive in a disk drive 24 which is mounted at the position corresponding to the target disk drive in the maintenance DE by using parity data in the disk drives 24, in the maintenance DE, to which data has been copied.

Cases 1 to 3 may be called "data movement from a DE 20 to be replaced to a maintenance DE". Upon completion of data movement to the maintenance DE, the CM 13 breaks a connection between the IOM 21 in the DE 20 to be replaced and its corresponding disk drives 24 and continues the operation by using the normal portion of hardware. Accordingly, the system operation may be continued until a prescribed time without stopping the storage control system 11 while redundancy is maintained.

Figure 4A:
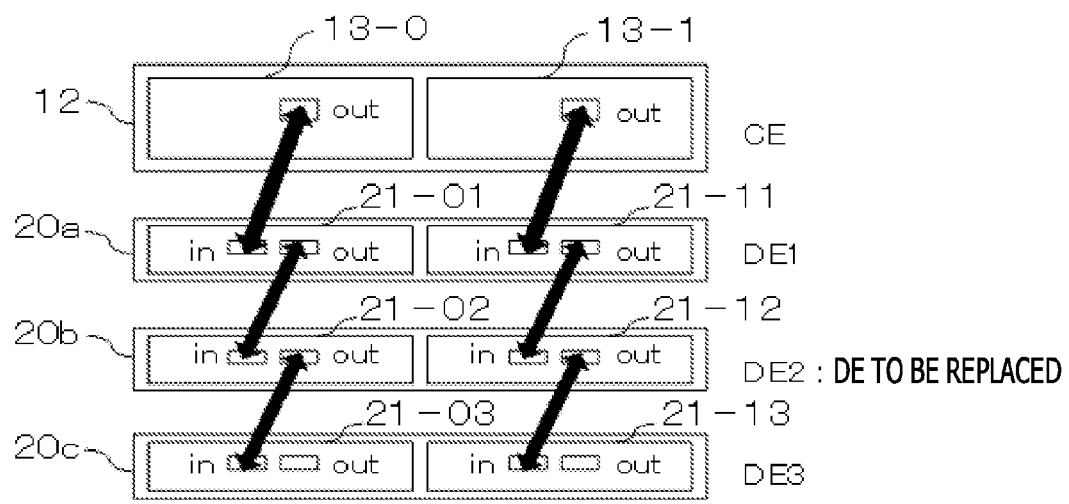
FIG. 4A illustrates an example of a cabinet of a storage control system in which a maintenance DE is yet to be mounted.
Figure 4B:
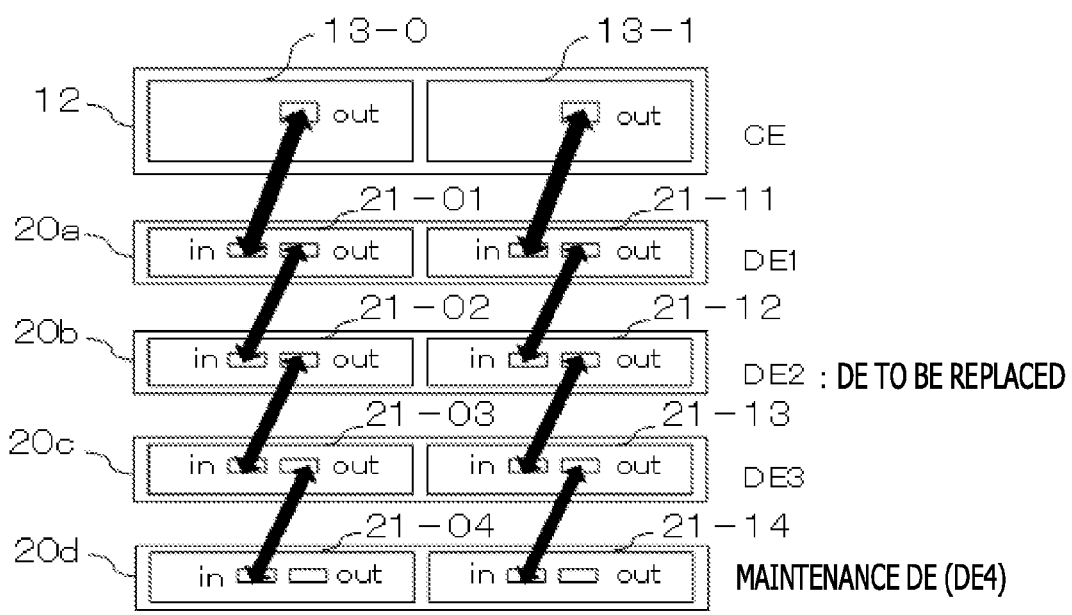
FIG. 4B illustrates an example of a cabinet of a storage control system in which a maintenance DE has been mounted.

FIG. 4A illustrates an example of a cabinet of a storage control system in which a maintenance DE is yet to be mounted, and FIG. 4B illustrates an example of a cabinet of a storage control system in which a maintenance DE has been mounted. In FIG. 4A, the cabinet 5 of the storage control system 11 before a maintenance DE is mounted is illustrated. The storage control system 11 may include one CE 12 and a plurality of DEs denoted 20a, 20b, and 20c. The CE 12 and the plurality of DEs 20a, 20b, and 20c are coupled in a cascade through a high-speed interface that uses SAS cables or the like.

In FIG. 4B, the cabinet 5 of the storage control system 11 after a maintenance DE has been mounted is illustrated. A DE 4 (maintenance DE) used for maintenance is coupled to the DE 20c at the end of the cascade connection. In normal system operation, therefore, the DEs 20a, 20b, and 20c operate.

In FIGS. 4A and 4B, between the CE and the DE 1, the output port of the CM 0 (13-0) is coupled to the input port of the IOM 0 (21-01) and the output port of the CM 1 (13-1) is coupled to input port of the IOM 1 (21-11). Between the DE 1 (20a) and the DE 2 (20b), the output port of the IOM 0 (21-01) is coupled to the input port of the IOM 0 (21-02) and the output port of the IOM 1 (21-11) is coupled to the input port of the IOM 1 (21-12). Between the DE 2 (20b) and the DE 3 (20c), the output port of the IOM 0 (21-02) is coupled to the input port of the IOM 0 (21-03) and the output port of the IOM 1 (21-12) is coupled to the input port of the IOM 1 (21-13).

Between the DE 3 (20c) and the maintenance DE 4 (20d), the output port of the IOM 0 (21-03) is coupled to the input port of the IOM 0 (21-04) and the output port of the IOM 1 (21-13) is coupled to the input port of the IOM 1 (21-14).

In FIGS. 4A and 4B, a DE in the storage control system 11 may fail and is thereby replaced. The access destination conversion table 8 before a failure occurs may be, for example, as illustrated in FIG. 3A. For example, the physical access destination corresponding to the logical access destination A may be the DE 1, the physical access destination corresponding to the logical access destination B may be the DE 2, and the physical access destination corresponding to the logical access destination C may be the DE 3. If a DE is replaced due to its failure, the DE 4 (20d) used for maintenance is connected to the DE 3 (20c) at the most bottom of the cascade connection in a state in which the storage control system 11 continues to operate.

In FIGS. 4A and 4B, the DE to be replaced may be the DE 2 (20b). For example, the CM 13 moves data in disk drives 24 in the DE 2 (20b) to be replaced to the maintenance DE 4 (20d) without stopping the DE 2 (20b). During this data movement, the CM 13 performs data mirroring until data in the DE 2 (20b) to be replaced and data in the maintenance DE 4 (20d) completely match, thereby copying the data in the DE 2 (20b) to the maintenance DE 4 (20d). If a write access to the logical access destination B is made during mirroring, since the logical access destination corresponding to the logical access destination B is the DE 2 in the accessed destination conversion table 8, a write access to the DE 2 is made. In this case as well, data written to the DE 2 (20b) is reflected in the maintenance DE 4 (20d) by the data mirroring.

Upon completion of data movement, the disk drives 24 are logically disconnected from the IOMs of the DE 2 (20b) to be replaced, and the DE 2 to be replaced may have only a switch function (relay function) for the DEs coupled in a cascade. The physical access destination corresponding to the logical access destination B in the accessed destination conversion table 8 may be changed from the DE 2 to the DE 4 (20d).

Figure 5:
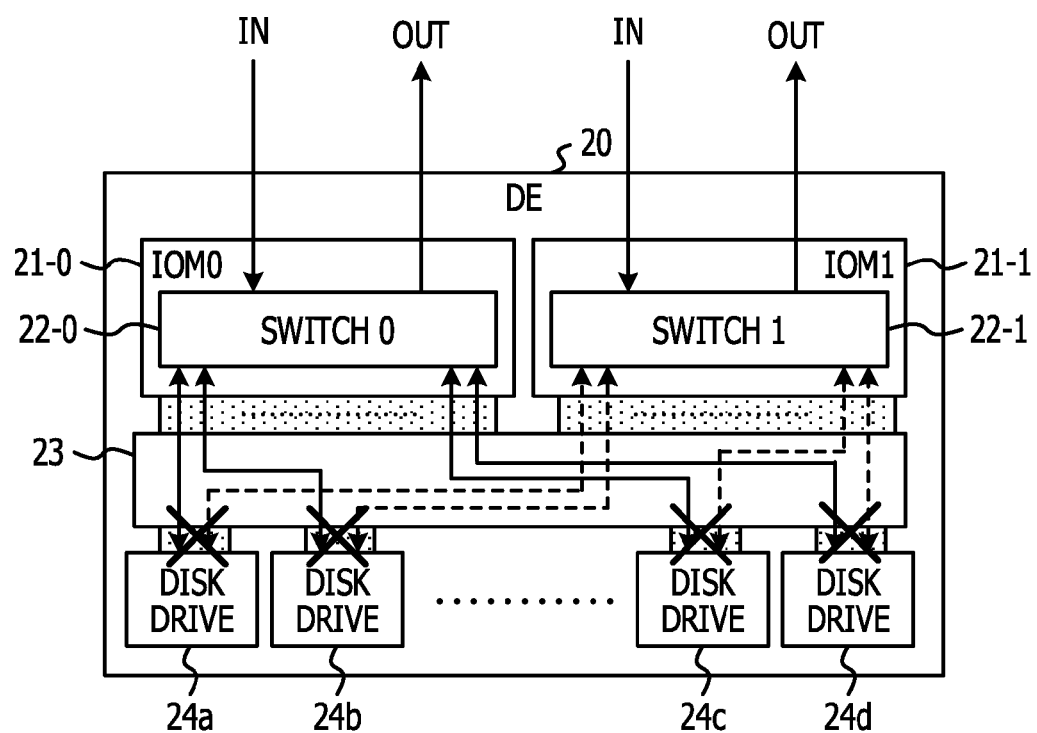
FIG. 5 illustrates an example of disconnecting disk drives from input-output modules (IOMs)

FIG. 5 illustrates an example of disconnecting disk drives from input-output modules (IOMs). In FIG. 5, disk drives 24 may be logically disconnected from the IOMs in the DE 2 to be replaced. After all disk drives 24 have been disconnected from the IOMs in the DE 2 to be replaced, the DE 2 to be replaced functions as a switch unit (a relay unit, for example) for the DEs coupled in a cascade. Therefore, access paths to all DEs coupled in a cascade to the DE at the end of the cascade connection may be assured without stopping the storage control system 11. The replaced DE 2 may be collected during maintenance.

Figure 6A:
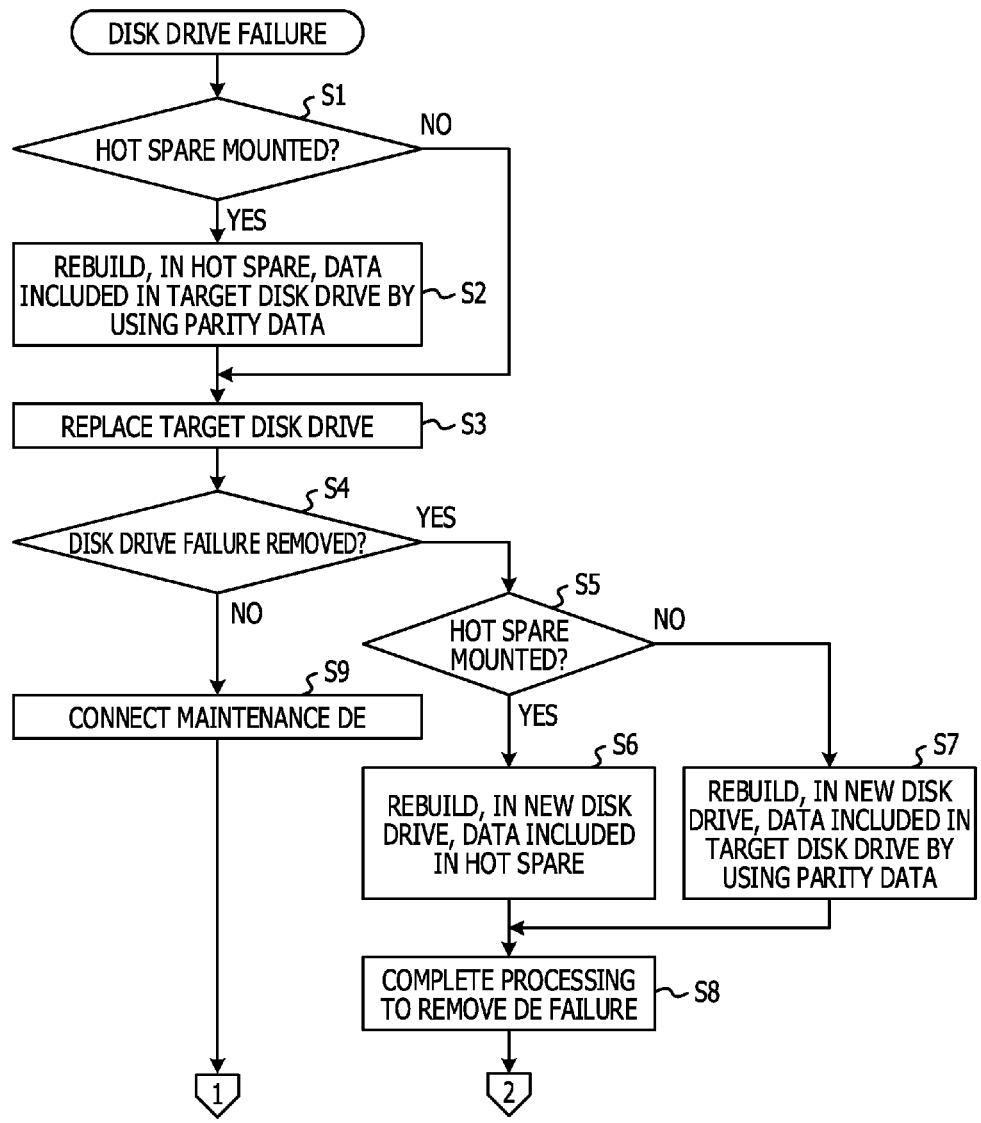
Figure 6C:
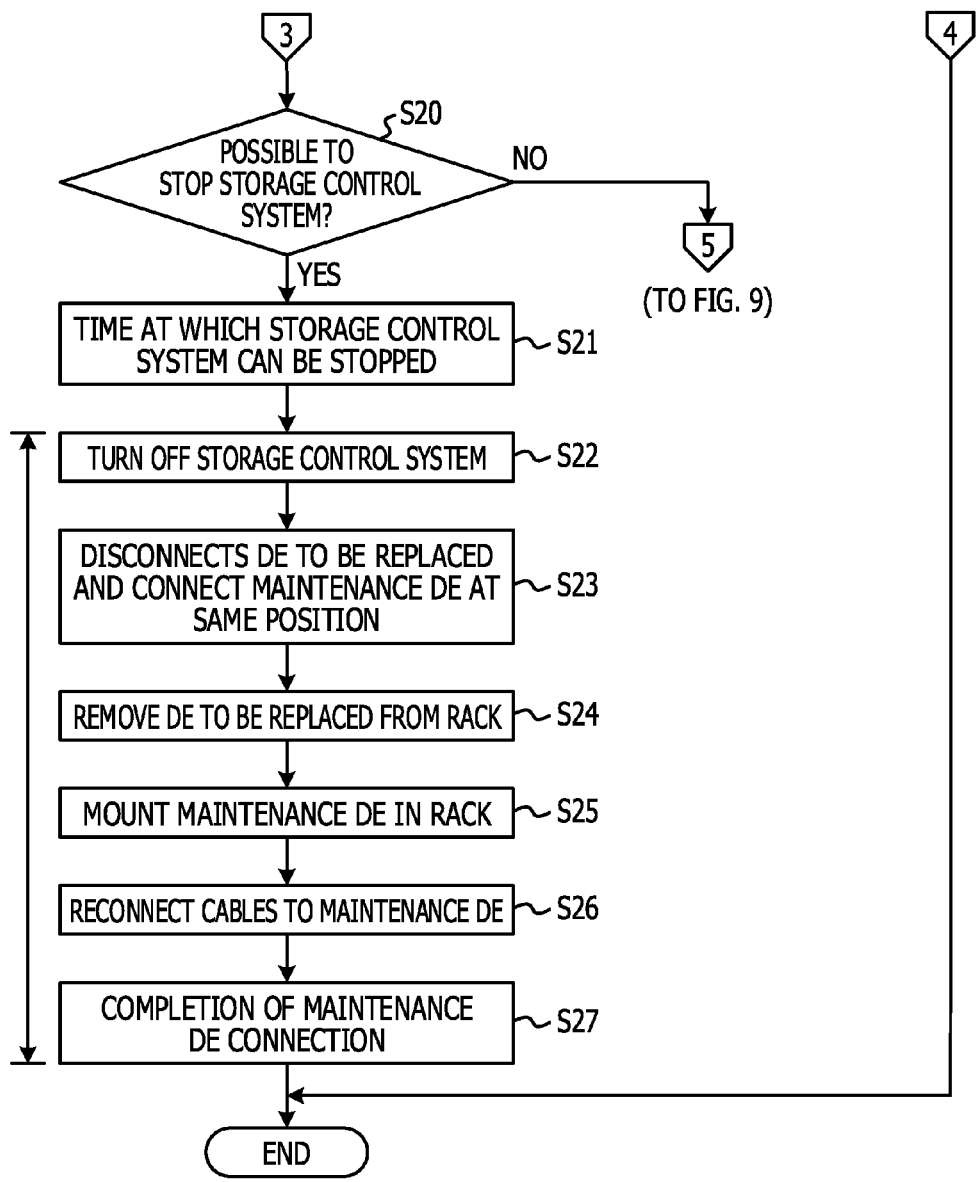

FIGS. 6A, 6B, and 6C illustrate an example of a flow of DE replacement. In FIGS. 6A, 6B, and 6C, a disk slot in a DE on the same side as the midplane 23 may fail, and thereby data in a particular disk drive 24 in a DE, for example, DE 2 (20b) in FIG. 4 may fail to be read, causing a problem in the DE 2. If an error occurs in a read access or a write access to a particular disk drive 24 in the DE 2 (20b), the DE 2 notifies the CM 13 of an error message that indicates an error has occurred. The CM 13 receives the error message from the DE 2, and the CM 13 detects a failure in the disk drive 24 in the DE 2 and enters the maintenance mode. The CM 13, for example, CPU 18 may read out a program to function as the detector 2, moving unit 3, or connection control unit 4 and may execute processing described below.

The CM 13 decides whether a hot spare is mounted in the failed DE 2 (20b) (S1). To make this decision, firmware in the CM 13 may send the DE 2 (20b) a command that checks whether a hot spare is mounted in the DE 2 (20b).

The DE 2 (20b) receives the command. If a hot spare is mounted, the DE 2 (20b) sends a replay indicating that a host spare is mounted. If a hot spare is not mounted, the DE 2 (20b) sends a replay indicating that no host spare is mounted. According to the reply, the CM 13 decides whether a hot spare is mounted in the DE 2 (20b).

If a hot spare is not mounted in the DE 2 (20b) (the result in S1 is No), the maintenance person replaces the disk drive 24 from which data can be no longer read (the disk drive 24 will be referred to below as the target disk drive) (S3).

If a hot spare is mounted in the DE 2 (20b) (the result in S1 is Yes), the CM 13 rebuilds, in the hot spare, data included in the target disk drive by using parity data stored in disk drives 24 which are other than the target disk drive in the DE 2 (20b) (S2). The maintenance person then replaces the target disk drive (S3).

The CM 13 decides whether the disk drive failure has been removed due to the replacement of the target disk drive (S4). If the disk drive failure has not been removed, the DE 2 (20b) may be replaced because, for example, recovery from the failure was unsuccessful in spite of the target disk drive having been replaced. Each DE notifies the CM 13 of an error message if an error such as the inability to access a disk drive 24 mounted in the DE occurs, the error message indicating the error. The CM 13 receives the error message and recognizes the error in the disk drive 24 in the DE.

If the disk drive failure has been removed due to the replacement of the target disk drive, for example, if the DE 2 (20b) has not notified the CM 13 of an error message (the result in S4 is Yes), the CM 13 decides whether a hot spare is mounted in the DE 2 (20b) (S5). The decision as to whether a hot spare is mounted in the DE 2 (20b) may be substantially the same as or similar to the decision in S1.

If a hot spare is mounted in the DE 2 (20b) (the result in S5 is Yes), the CM 13 copies the data, originally included in the target disk drive, that has been rebuilt in the hot spare in S3 to the new disk drive to rebuild the data in the new disk drive (S6). This completes the processing to remove the DE failure (S8).

If a hot spare is not mounted in the DE 2 (20b) (the result in S5 is No), the CM 13 rebuilds the data in the new disk drive by using parity data stored in disk drives 24 other than the replaced disk drive in the DE 2 (S7). This completes the processing to remove the DE failure (S8).

If the disk drive failure has not been removed in spite of the replacement of the target disk drive in S4, for example, if the DE 2 (20b) has notified the CM 13 of an error message (the result in S4 is No), the maintenance person may perform a task described below. For example, the maintenance person couples the maintenance DE 4 (20d) to the DE 3 (20c) at the end of the cascade connection of the DEs constituting the storage control system 11 (S9).

The CM 13 recognizes the newly coupled maintenance DE 4 (20d) (S10). The CM 13 then decides whether the storage control system ibis in a ready state (S11). If the storage control system 11 is in the ready state (the result in S11 is Yes), a procedure for adding a DE is carried out (S12).

If the storage control system 11 is not in the ready state (the result in S11 is No), the CM 13 decides whether a hot spare is mounted in the DE 2 (20b) or maintenance DE 4 (20d) (S13). The decision as to whether a hot spare is mounted in the DE 2 (20b) or maintenance DE 4 (20d) may be substantially the same as or similar to the decision in S1.

If a hot spare is mounted in the DE 2 (20b) (the result in S13 is Yes), the CM 13 copies data included in the target disk drive in the DE 2 (20b) from the hot spare to the disk drive 24, in the same slot, in the maintenance DE 4 (20d) as the slot in the failed disk drive (S14).

If a hot spare is not mounted in the DE 2 (20b) (the result in S13 is No), the CM 13 rebuilds the data, in the disk drive 24, in the same slot in the maintenance DE 4 (20d) as the slot in the failed disk drive by using parity data stored in disk drives 24, other than the failed disk drive, in the DE 2 (20b) (S15).

After this, the CM 13 copies data included in another disk drive 24 in the DE to be replaced to the disk drive 24, in the same slot, in the maintenance DE 4 (20d) as in the DE to be replaced (S16).

The CM 13 decides whether there is a match in data between the DE to be replaced and the maintenance DE 4 (20d) (S17). If there is no match in data between the DE to be replaced and the maintenance DE 4 (20d) (the result in S17 is No), the CM 13 performs mirroring for each disk drive 24 between the DE to be replaced and the maintenance DE 4 (20d) (S18).

If there is a match in data between the DE to be replaced and the maintenance DE 4 (20d) (the result in S17 is Yes), the CM 13 updates the accessed destination conversion table 8 and breaks the logical connection between the SAS expander 22 and each disk drive 24 as illustrated in FIG. 5 (S19). For example, firmware in the CM 13 changes the physical access destination corresponding to the logical access destination targeted in the accessed destination conversion table 8 from the DE to be replaced to the maintenance DE 4 (20d). In the SAS expander 22, the CM 13 makes all ports coupled to the disk drives 24 unusable to break the logical connection between the SAS expander 22 and the disk drives 24.

The CM 13 continues the system operation in this state. Even if the physical address of a DE to be physically accessed is changed, its logical address remains unchanged. The CPU 18 in the CM 13 uses the logical address to create a request to access the DE and accesses the logical address in the same state as before the DE has been switched, so the system operation may not be changed.

Even if the logical connection between the SAS expander 22 and a disk drive 24 is broken, the SAS expander 22 is effectively functioning, so the DE to be replaced continues to function as a relay unit. Accordingly, the system operation may be continued until a prescribed time without stopping the storage control system 11 while redundancy is maintained.

Then, the maintenance person decides whether it is possible to stop the storage control system 11 (S20). If it is possible to stop the storage control system 11 (the result in S20 is Yes), at a time at which the storage control system 11 can be stopped (S21), the maintenance person turns off power to the storage control system 11 (S22). An example of a time at which the storage control system 11 can be stopped may be a time in a long vacation such as new-year holidays during which the customer's business is not affected. If it is not possible to stop the storage control system 11 (the result in S20 is No), a flow of DE replacement illustrated in FIG. 9 may be carried out.

The maintenance person disconnects the DE to be replaced and couples the maintenance DE 4 (20d) at the position at which the DE to be replaced has been mounted (S23). The maintenance person removes the DE to be replaced from the rack (S24). The maintenance person mounts the maintenance DE 4 (20d) in the rack (S25). The maintenance person reconnects cables to the maintenance DE 4 (20d) (S26). This completes the connection of the maintenance DE 4 (20d) (S27).

If, for example, no hot spare is mounted in a DE, after the maintenance DE 4 (20d) has been coupled, data in a certain disk drive 24 in the DE to be replaced is rebuilt in the disk drive 24 in the same slot, in the maintenance DE 4 (20d), as in the DE to be replaced by using a remaining disk drive 24 in the RAID group. After the data has been rebuilt, data in the remaining disk drives 24 in the DE to be replaced is also copied to disk drives 24 in the maintenance DE 4 (20d). Since data is copied without stopping the storage control system 11, data mirroring is performed between the DE to be replaced and the maintenance DE 4 (20d). After data in the DE to be replaced and data in the maintenance DE 4 (20d) have completely matched, the disk drives 24 are disconnected from the DE to be replaced and the disk drives 24 functions only as a switch unit for the DEs coupled in a cascade. In the DE to be replaced, for example, only the relay function is enabled; the DE to be replaced functions as a relay unit for a plurality of DEs coupled in a cascade. Firmware in the CM 13 changes the physical access destination corresponding to the logical access destination targeted at the accessed destination conversion table 8 from the DE to be replaced to the maintenance DE. The CM 13 continues the system operation in this state. Even if a DE to be physically accessed is changed, its logical address in the accessed destination conversion table 8 remains unchanged. Therefore, the CM 13 accesses the logical address in the same state as before the DE has been switched, so the system operation may not be changed.

Data may be moved (rebuilt, copied, or rebuild and copied) without stopping the storage control system 11. Operation without RAID redundancy may be minimized. Since an operation is performed while the DE to be replaced is turned on, it is safe to collect the replaced DE during periodic maintenance in, for example, new-year holidays or another period during which the system can be stopped. Since data movement (rebuilding, copying, or rebuilding and copying) is performed in advance, DE replacement may be completed without stopping the system for a long period of time and without a load on the operator.

As a movement pattern, the CM 13 may copy data in all disk drives 24 accommodated in the DE to be replaced to disk drives 24 accommodated in the maintenance DE. After the data has been copied, the CM 13 may perform processing described below according to the parity data of disk drives 24, included in the maintenance DE, that are other than the disk drive 24 corresponding to a failed disk drive 24 in the DE to be replaced. For example, the CM 13 may rebuild data, included in the failed disk drive 24, in the disk drive 24, in the maintenance DE, that corresponds to the failed disk drive 24 in the DE to be replaced.

FIG. 7 illustrates examples of times during which a storage control system was stopping. FIG. 7 illustrates times during which the storage control system 11 was stopping when the DE replacement flow described above is applied and times during which the storage control system 11 was stopping when the DE replacement flow is not applied. When the replacement flow is not applied, disk drive replacement takes 20 minutes, DE replacement takes 10 minutes, cable reconnection takes 20 minutes, and rebuilding takes 100 minutes, totaling 150 minutes. Time taken for rebuilding may be, for example, a time estimated under the conditions that the capacity of the disk drive 24 is 600 gigabytes (GBs) and the writing speed is 100 megabytes/s (MB/s). The rebuilding time changes depending on various conditions.

The life of the disk drive 24 may be several years, for example, 5 years. Even if long-time maintenance in which a large amount of data is moved to a maintenance DE is performed when the disk drive 24 is approaching its life, if the above DE replacement flow is applied, the DE may be efficiently replaced. Since neither the disk drive 24 nor data is moved while the storage control system 11 is stopping, the load on the operator may be reduced.

Since a time during which the storage control system 11 is stopping may be shortened, the DE replacement flow described above may be applicable even in a case in which it is desirable to quickly replace a DE because there is no place where a maintenance DE is placed.

If a position at which to mount a DE in a rack is not important, an operation described below may be carried out and the replaced DE may be collected without stopping the storage control system 11. In the storage control system 11, cables between the CM 13 and the DE and between DEs in one system are removed, the DE to be replaced is then replaced with a maintenance DE, and then recabling is carried out. While recabling is being executed, the system operation is continued in the other system. Data paths are switched to a system that has been newly coupled due to recabling. Recabling is similarly carried out on the remaining system. After recabling, the maintenance person makes the two systems active (sets the two systems so as to operate). After that, the replaced DE may be recovered.

Figure 8A:
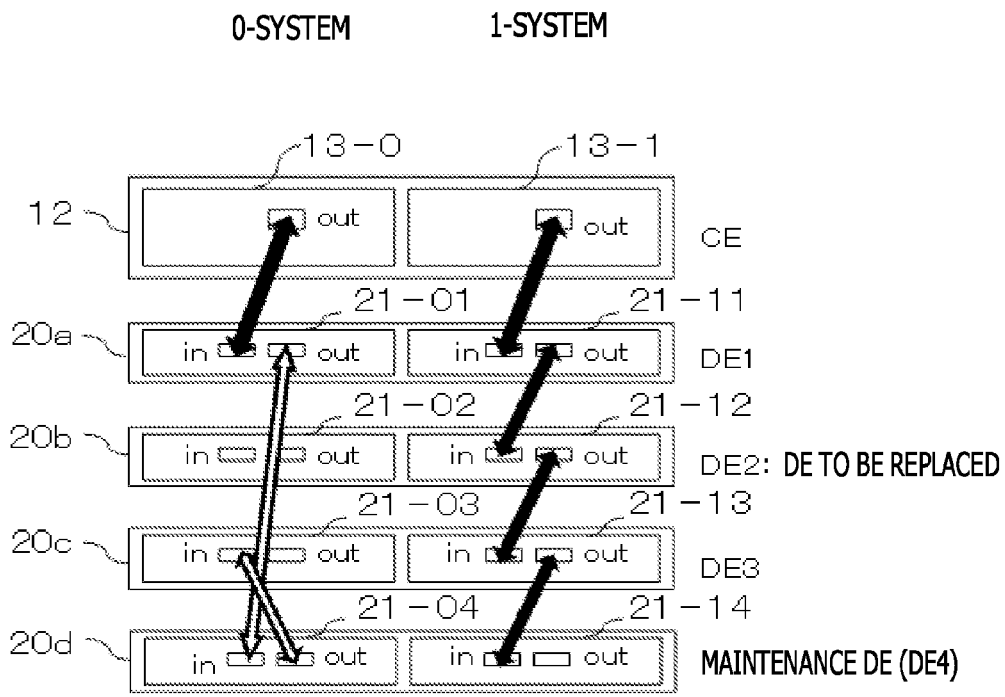
FIGS. 8A and 8B each illustrate an example of cabling.
Figure 8B:
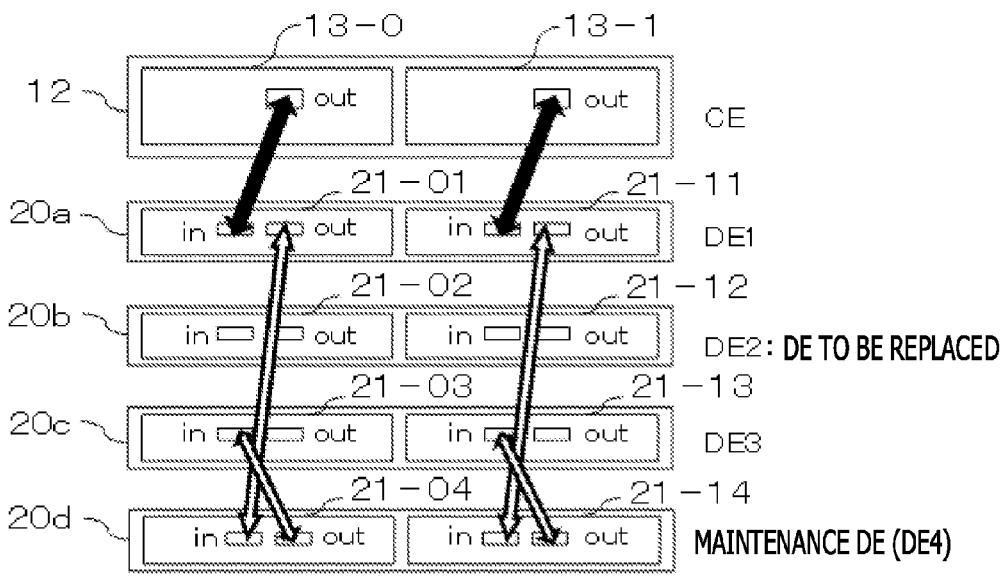

FIGS. 8A and 8B each illustrate an example of cabling. After data in the DE to be replaced has been moved to the maintenance DE 4, if the storage control system 11 fails to stop, the data paths are switched to, for example, a 1-system and cable connection in a 0-system is changed, as illustrated in FIG. 8A.

In cabling illustrated in FIG. 8A, the DE 2 in FIG. 4 may be replaced with a maintenance DE 4. The remote end of the cable coupled to the out port of the IOM 21-01 of the DE 1 may be switched from the in port of the IOM 21-02 of the DE 2 to the in port of the IOM 21-04 of the maintenance DE 4.

The remote end of the cable coupled to the in port of the IOM 21-03 of the DE 3 is switched from the out port of the IOM 21-02 of the DE 2 to the out port of the IOM 21-04 of the maintenance DE 4. As a result, a cabling state becomes as illustrated in FIG. 8A.

After the cabling state has been changed as illustrated in FIG. 8A, whether the CM 13 can normally access each disk drive 24 in each DE is checked. If it is checked that the CM 13 can normally access each disk drive 24 in each DE, the CM 13 switches the data paths to the 0-system. For example, the CM 13 accesses each DE through the SAS expander 22 and cables in the 0-system. Cable connection in the 1-system is changed again as illustrated in FIG. 8B. Then, whether the CM 13 can normally access each disk drive 24 in each DE is checked again. After this check, both the 0-system and 1-system are set active.

Figure 9:
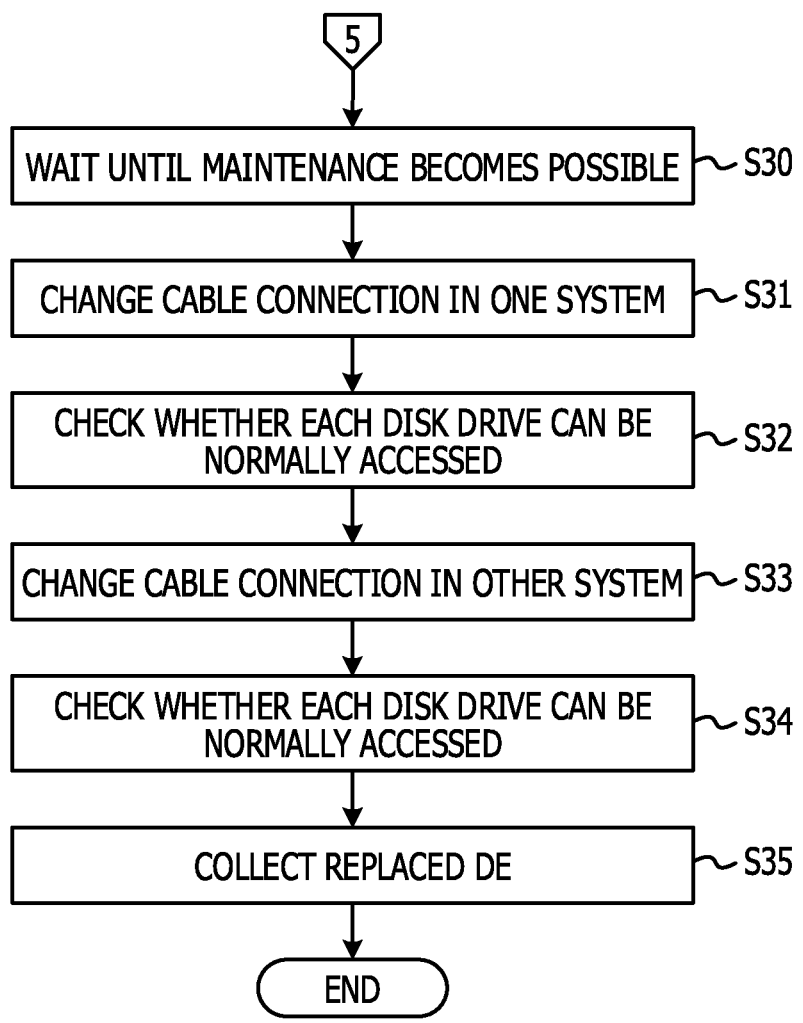
FIG. 9 illustrates an example of a flow of DE replacement.

FIG. 9 illustrates an example of a flow of DE replacement. The DE replacement flow in FIG. 9 may be carried out when it is decided in S20 in FIG. 6C that the storage control system 11 is not stopped.

In S20, the maintenance person waits until maintenance becomes possible (S30). When a time at which maintenance is possible is reached, the maintenance person may carry out the operation S31 and later in active maintenance without turning off the storage control system 11.

The maintenance person changes cable connection in one system in the storage control system 11, replace the maintenance DE with a replacement DE, and carries out cabling again (S31). During this cabling, the system operation is continued in the other system.

Then, the maintenance person checks whether the CM 13 can normally access each disk drive 24 in each DE (S32). After checking that the CM 13 can normally access each disk drive 24 in each DE, the maintenance person changes cable connection in the other system (S33). Then, the maintenance person checks whether the CM 13 can normally access each disk drive 24 in each DE (S34). After this check, the maintenance person makes both the 0-system and 1-system active. The maintenance person then collects the replaced DE (S35).

If a position at which to mount a DE in a rack is not important, the replaced DE may be collected without stopping the storage control system 11. The DE mounting positions in the rack may be changed to their original state during periodic maintenance in, for example, new-year holidays or another period during which the system can be stopped.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A storage control apparatus for use with a plurality of cabinets coupled in a cascade, each cabinet of the plurality of cabinets including a plurality of storages, the storage control apparatus comprising:
   at least one memory configured to store a program; and
   at least one processor configured to execute the program, wherein the execution of the program by the at least one processor causes the following to be performed:
      detecting a failure in a respective storage of the plurality of storages included in a first cabinet of the plurality of cabinets;

moving data in at least one of the plurality of storages included in the first cabinet, and including the respective storage in which the failure was detected, to at least one of the plurality of storages included in a second cabinet of the plurality of cabinets;

rebuilding, when the plurality of storages included in the first cabinet do not include a spare storage, data included in the respective storage in which the failure was detected using parity data included in any one of the plurality of storages included in the first cabinet other than the respective storage in which the failure was detected, into corresponding storage of the plurality of storages included in the second cabinet;

controlling, in accordance with the moving and the rebuilding, a first connection between the first cabinet and the plurality of cabinets other than the first cabinet, and a second connection between the plurality of storages included in the first cabinet and the plurality of cabinets other than the first cabinet;

checking, after the moving, whether data in at least one of the plurality of storages included in the first cabinet matches data in at least one of the plurality of storages included in the second cabinet; and when the checking indicates that the data does not match, performing mirroring of data between at least one of the plurality of storages included in the first cabinet and at least one of the plurality of storages included in the second cabinet.

2. The storage control apparatus according to claim 1, wherein the second cabinet is coupled in the cascade directly or indirectly to the first cabinet.

3. The storage control apparatus according to claim 1, wherein the controlling continues the first connection and breaks the second connection.

4. The storage control apparatus according to claim 1, wherein
the controlling breaks the second connection, and
the execution of the program by the at least one processor causes the following to further be performed:
after breaking the second connection, changing an access to the plurality of storages included in the first cabinet to an access to the plurality of storages included in the second cabinet.

5. The storage control apparatus according to claim 1, wherein the moving moves all data in the plurality of storages included in the first cabinet to at least one of the plurality of storages included in the second cabinet.

6. The storage control apparatus according to claim 1, wherein the execution of the program by the at least one processor further causes the following to be performed:
copying data in the plurality of storages included in the first cabinet, other than the respective storage in which the failure was detected, to corresponding storages of the plurality of storages included in the second cabinet.

7. The storage control apparatus according to claim 1, wherein the execution of the program by the at least one processor further causes the following to be performed:
when the plurality of storages included in the first cabinet include a spare storage,
rebuilding data included in the respective storage in which the failure was detected using parity data included in one of the storages included in the first cabinet other than the respective storage in which the failure was detected, and copying data in the spare storage into a corresponding storage of the plurality of storages included in the second cabinet.

8. A storage control system comprising:
a plurality of cabinets coupled in a cascade, each cabinet of the plurality of cabinets including a plurality of storages; and
a storage control apparatus that
detects a failure in a respective storage of the plurality of storages included in a first cabinet of the plurality of cabinets,
moves data in at least one of the plurality of storages included in the first cabinet, and including the respective storage in which the failure was detected, to at least one storage of the plurality of storages included in a second cabinet of the plurality of cabinets
rebuilds, when the plurality of storages included in the first cabinet do not include a spare storage, data included in the respective storage in which the failure was detected using parity data included in any one of the plurality of storages included in the first cabinet other than the respective storage in which the failure was detected, into corresponding storage of the plurality of storages included in the second cabinet,
controls, in accordance with the moving and the rebuilding, a first connection between the first cabinet and the plurality of cabinets other than the first cabinet, and a second connection between the plurality of storages included in the first cabinet and the plurality of cabinets other than the first cabinet,
checks, after the data is moved, whether data in at least one of the plurality of storages included in the first cabinet matches data in at least one of the plurality of storages included in the second cabinet, and
when the check indicates that the data does not match, performs mirroring of data between at least one of the plurality of storages included in the first cabinet and at least one of the plurality of storages included in the second cabinet.

9. The storage control system according to claim 8, wherein
the control of the second connection includes breaking the second connection,
and the storage control apparatus, after breaking the second connection, changes an access to the plurality of storages included in the first cabinet to an access to the plurality of storages included in the second cabinet.

10. The storage control system according to claim 8, wherein, when the plurality of storages included in the first cabinet include a spare storage, the storage control apparatus:
rebuilds data included in the respective storage in which the failure was detected using parity data included in one of the plurality of storages included in the first cabinet, other than the respective storage in which the failure was detected, into the spare storage, and
copies the data in the spare storage into corresponding storage of the plurality of storages included in the second cabinet.

11. A storage control method for use with a plurality of cabinets coupled in a cascade, each cabinet of the plurality of cabinets including a plurality of storages, the method comprising:

detecting, by a processor, a failure in a respective storage of the plurality of storages included in a first cabinet of the plurality of cabinets;

moving data in at least one of the plurality of storages included in the first cabinet, and including the respective storage in which the failure was detected, to at least one of the plurality of storages included in a second cabinet of the plurality of cabinets;

rebuilding, when the plurality of storages included in the first cabinet do not include a spare storage, data included in the respective storage in which the failure was detected using parity data included in any one of the plurality of storages included in the first cabinet other than the respective storage in which the failure was detected, into corresponding storage of the plurality of storages included in the second cabinet;

controlling, in accordance with the moving and the rebuilding, a first connection between the first cabinet and the plurality of cabinets other than the first cabinet, and a second connection between the storages included and the first cabinet and the plurality of cabinets other than the first cabinet;

checking, after the moving, whether data in at least one of the plurality of storages included in the first cabinet matches data in at least one of the plurality of storages included in the second cabinet; and when the checking indicates that the data does not match, performing mirroring of data between at least one of the plurality of storages included in the first cabinet and at least one of the plurality of storages included in the second cabinet.

12. The storage control method according to claim 11, wherein
the controlling breaks the second connection, and
the method further comprises:
after breaking the second connection, changing an access to the plurality of storages included in the first cabinet to an access to the plurality of storages included in the second cabinet.

13. The storage control method according to claim 11, wherein the method further comprises, when the plurality of storages included in the first cabinet include a spare storage:
rebuilding data included in the respective storage in which the failure was detected using parity data included in one of the plurality of storages included in the first cabinet, other than the respective storage in which the failure was detected, into the spare storage, and
copying the data in the spare storage into corresponding storage of the plurality of storages included in the second cabinet.

* * * * *